UNITED STATES PATENT OFFICE.

ARTHUR EICHENGRÜN, OF BERLIN, GERMANY.

PLASTIC SIMILAR TO CELLULOID AND MANUFACTURING THE SAME.

1,015,156.      Specification of Letters Patent.      Patented Jan. 16, 1912.

No Drawing. Original application filed January 21, 1910, Serial No. 539,246. Divided and this application filed February 9, 1911. Serial No. 607,617.

*To all whom it may concern:*

Be it known that I, ARTHUR EICHENGRÜN, doctor of philosophy, chemist, a subject of the King of Prussia and the German Emperor, residing at 87 Konstanzerstrasse, Berlin, Kingdom of Prussia, German Empire, have invented new and useful Improvements in Plastics Similar to Celluloid and Manufacturing the Same, of which the following is a specification.

This invention relates to new plastics similar to celluloid, and the manufacture of said plastics, and has for its object to obtain from cellulose acetates masses which are hard when cold and possess springy, elastic properties, while retaining the uninflammable properties of the cellulose acetate.

I have found that cellulose acetates, particularly those soluble in acetone or acetic ether, can be readily converted into solutions, adapted to be worked up further into plastic masses, by the simultaneous action of alcohols and other liquids which do not dissolve cellulose acetates when heated and when cold. I have especially found mixtures of hydrocarbons and alcohols as suitable for my purposes. Cellulose acetates are insoluble in highly concentrated alcohols alone and in hydrocarbons alone both when heated and when cold; on the other hand, as I have discovered they dissolve in a mixture of hydrocarbons and alcohols under the action of heat. Of alcohols particularly the aliphatic have proved suitable, and of hydrocarbons the aromatic. Those boiling below 125° C. come particularly into consideration. The choice of the substances depends on the price. The formation of solutions of cellulose acetate in this manner I do not claim broadly herein, nor do I claim specifically the formation of liquid or fluent solutions, such being the matter of my copending application Serial No. 539,246, filed January 21, 1910, whereof the present application is divisional.

In the process of the present embodiment of my invention, I treat the cellulose acetate which is to be dissolved with the mixture of hydrocarbon and alcohol and heat the same. It is preferable to heat to approximately the boiling point of the solvent without exceeding the same.

When the solutions formed as just described are cooled the cellulose acetate is completely precipitated in the form of a voluminous fibrous mass. This precipitation can be prevented by adding to the solution or directly to the solvent mixture used for the solution solvents which are capable of dissolving the acetates even when cold, such as acetone, acetic ether, acetic acid. In this manner fluent solutions of cellulose acetate which remain liquid or have a syrupy character are obtained. Substances which are able to dissolve cellulose acetate act in like manner, such as dichlorhydrin, acetate of glycerin, ether of lactic acid, and so on. These additions have generally the property of being non volatile at ordinary temperature and under ordinary storage conditions. The said additions have the effect of making the masses soft. When cold, honey-like viscous or gelatinizing masses are obtained according in each instance to the quantity of these admixtures. This is particularly the case when, as admixture, camphor or camphor substitutes, such as acidyl derivatives of primary and secondary aromatic amins, aromatic sulfo compounds, aromatic nitro compounds, or phenol derivatives are employed as admixture. However, when in proper proportions, the admixture of cellulose acetates, solvent and camphor substitute can be allowed to cool and congeal after solution has taken place to form firm, hard bodies which can be used for plastic purposes. Blocks are obtained which in spite of the presence of the entire solvent can be cut and readily worked up further. The melted masses may be molded while still molten and only then allow to congeal. For example they may be allowed to pass through round orifices and in this manner tubes, round rods, threads, filaments or the like can be obtained.

The solvents and the admixtures may be added either before or during the operation of solution as well as after the solution. Solutions thus obtained which are of such a character as to remain liquid on cooling may be applied on surfaces, such as paper, fabric, leather and the like. The solutions which congeal or solidify when cold may be poured hot on the supports or applied thereto after congealing by pressure, for example by rollers or presses. In this case heat is preferably applied. My process can also be carried into practice by adding the liquids in succession, or by first mixing cellulose acetate with camphor or camphor substitutes and subsequently adding the solvents.

According to the present invention I may obtain plastics by treating the cellulose acetates in the presence of relatively small quantities of camphor or camphor substitutes with the mixture of non-solvents or non-dissolving liquids. With such compositions when the liquid has been removed by evaporation from the firm gelatinous mass which is first formed on cooling, a material is obtained which is exactly like celluloid with regard to elasticity and other properties.

In order to obtain masses from cellulose acetate having the properties of celluloid, I may treat cellulose acetate in alcohol and benzol with camphor or camphor substitutes under the action of heat. When the solution cools firm, gelatinous masses are produced which can readily be worked up by cutting, molding, pressing and so on. The solvent can be removed from these masses by evaporation, for example by passing over them dry air, by heating them, or the like.

For carrying my invention into practice it is not necessary to completely dissolve the cellulose acetate in the liquid mixture and finally to add the camphor substitutes. On the contrary, the camphor substitutes may be added during the process of solution. Also, cellulose acetates may be mixed with camphor or camphor substitutes and then treated with the solvent. The last process is preferable, particularly when it is wished to employ as little liquid as possible.

In order to remove any impurities which may be present, I may filter hot the solution of cellulose acetate made under the action of heat, leave it to cool and pour off any separated liquid from the cellulose acetate. The separated cellulose acetate still containing solvent is then mixed with camphor or camphor substitutes and exposed to pressure or heat or both. A very small quantity of camphor or camphor substitutes is required, as the cellulose acetates are in a very finely divided state or form.

Example I: 1 kg. cellulose acetate is dissolved in 2 kg. methyl alcohol and 1 kg. toluol at 80° C., 150 grams acetylmethylanilin (so called manol) and 100 grams epichlorhydrin are added to the solution and filtered hot. When cooling, the solution congeals to a firm mass which can readily be cut or pressed in molds or forced through shaped orifices.

Example II: 1 kg. cellulose acetate is mixed with 240 grms. acetylmethylanilin dissolved in 900 grms. of a mixture of equal parts of alcohol and benzol, and vigorously kneaded for a long time at 30° to 40° C. in a malaxator. After some hours the mixture is converted into a perfectly homogeneous transparent mass which can be worked up further in the manner of celluloid.

Example III: 1 kg. cellulose acetate is dissolved in 10 kg. of a mixture of alcohol and benzol at 70° C. and filtered hot. After cooling, the entire quantity of the cellulose acetate is precipitated in the form of a coherent mass like cotton-wool. The same is separated from the bulk of the liquid mixture and heated with 200 grms. trichloranilin, when a clear, celluloid-like mass forms. If liquid mixtures which can act unfavorably on the celluloid-like masses, as e. g. a mixture of alcohol and water, be employed as solvent of the cellulose acetate, it is preferable to liberate the cellulose acetate, which precipitates when the mixture cools, from the liquid mixture still contained therein and to moisten it with a suitable mixture, such as alcohol-benzol.

The solutions obtained according to the herein described process can not only be worked up in the manner of celluloid by allowing the same to dry in the form of blocks and the like and working up further the firm masses thus obtained as in the case of celluloid, but the same may be converted by heat into the liquid state again, and these hot liquid solutions can be worked up further by ejecting the same from corresponding orifices, e. g. slits, when the films congeal in the air and can be dried on suitable supports. Also, these hot liquid solutions can be cast in molds, or patterns may be dipped into the same whereupon the corresponding layers at once assume the corresponding shapes when cooling; or the solutions may be poured from wide orifices directly on the smooth or impressed, possibly ornamented and molded supports, and allowed to congeal on these. Further, articles of all kinds can be coated with equal ease with a thick, celluloid-like layer by immersing them in the solutions, or articles of greater length, such as wires, chains, threads, yarn, ropes, may be provided uniformly in one operation with a thick coating of cellulose acetate by passing them through the solutions. By admixing coloring matter with the solutions the masses thus obtaining can be colored optionally; also, for the purpose of obtaining special effects or properties other bodies, such as e. g. resins, mineral substances as white zinc, graphite, mica, asbestos or powdered metal, and so on, may be added to them. This mode of treatment differs entirely from that of celluloid in which the manufacture of highly concentrated solutions giving a glaze-like coating by a single application or immersion has not been possible heretofore owing to the lack of a suitable solvent, and in which it would be quite impossible to work up the celluloid mass itself in the above described manner on account of its high melting point and its viscosity.

What I claim as my invention and desire to secure by Letters Patent, is:—

1. The process of manufacturing solid celluloid like masses which comprises causing a heated mixture of an alcohol and an aromatic hydrocarbon to act on cellulose acetates in the presence of camphor or camphor substitutes in such proportions relative to said acetate that homogeneous masses may be produced.

2. The process of manufacturing solid celluloid like masses which comprises causing a heated mixture of an alcohol and an aromatic hydrocarbon to act on cellulose acetates in the presence of camphor or camphor substitutes in such proportions relative to said acetate that homogeneous masses may be produced, and evaporating the mixture of alcohol and aromatic hydrocarbons.

3. The process of manufacturing solid celluloid like masses which comprises causing a heated mixture of an alcohol and an aromatic hydrocarbon to act on cellulose acetates in the presence of non volatile solvents for cellulose acetates and of camphor or camphor substitutes in such proportions relative to said acetate that homogeneous masses may be produced.

4. A celluloid-like plastic comprising cellulose acetate, an alcohol, an aromatic hydrocarbon and camphor or camphor substitutes.

5. A celluloid-like plastic comprising cellulose acetate alcohol, toluol and camphor or camphor substitutes.

In testimony whereof, I have signed my name to this specification in the presence of two subscribing witnesses.

ARTHUR EICHENGRÜN.

Witnesses:
HENRY HASPER,
WOLDEMAR HAUPT.